3,186,919
PROCESS FOR PREPARING GALACTOSE OXIDASE BY FERMENTATION
Chauncey O. Rupe, Elkhart, Ind., assignor to Miles Laboratories, Inc., Elkhart, Ind., a corporation of Indiana
No Drawing. Filed Oct. 22, 1962, Ser. No. 232,260
9 Claims. (Cl. 195—66)

This invention relates to the production of galactose oxidase. In one of its more particular aspects, this invention relates to the production of galactose oxidase by fermentation methods. In yet another of its more particular aspects, this invention relates to the use of a novel fermentation medium for the production of galactose oxidase.

Galactose oxidase is an enzyme which catalyzes the oxidation of galactose in the presence of molecular oxygen. The activity of this particular enzyme is outstanding with respect to its specificity for a galactose substrate. Its activity upon glucose and simple sugars other than galactose is practically nil. Galactose oxidase is useful in detecting galactose when used with suitable indicator systems in diagnostic compositions, for converting galactose to its oxidation products, which is of utility in freeing certain foods of galactose, and in other industrial applications such as the removal of oxygen from various materials.

Previous methods of producing this enzyme have been the fermentation of media containing galactose and a plurality of mineral constituents. For example, the method of Cooper, U.S. Patent No. 3,005,714, utilizes an aqueous medium containing galactose and a variety of mineral salts.

These previous methods, however, have in general produced slow growth of the enzyme producing organism and have resulted in relatively poor yields of enzyme. Accordingly, a principal object of this invention is to provide a process for the production of galactose oxidase whereby the yield is within the realm of practical reality.

Another object of this invention is to provide a method for the production of galactose oxidase which utilizes a fermentation medium which is a better medium for growth of the galactose oxidase producing organism than that of the prior art.

Another object of this invention is to provide galactose oxidase in high yields.

A further object of this invention is to provide a process for the production of galactose oxidase which requires a minimum of complicated manipulations.

Other objects and the various advantages of this invention will become apparent in the course of the following detailed disclosure and description.

It has now been found that galactose oxidase may be produced by means of fermentation of a suitable culture medium with the organism *Polyporus circinatus* Fr. This medium includes, in any combination, as the primary ingredients a carbohydrate, an organic nitrogen source such as protein or protein hydrolyzate and an additional nitrogen containing nutrient which is a derivative of an organic acid. Also included in the medium are certain conventional nutrients which have been found to facilitate the growth of the organism.

In producing galactose oxidase according to the method of this invention the cultures of *Polyporus circinatus* Fr. are allowed to stand in flasks containing the culture medium to initiate growth. After standing for 2–3 days the culture is sufficiently developed to be transferred to a fermentation medium at a hydrogen ion concentration of about from pH 6.3 to pH 6.8 for the production fermentation. During the fermentation, the inoculated medium is agitated and maintained at or near room temperature. For example, temperatures in the range of about from 23° C. to 30° C. are satisfactory. Air is passed through the medium in order to insure thorough mixing and suitable aeration.

The fermentation may be followed by a suitable assay technique to determine when the peak yield of galactose oxidase has been reached. It has been found that this yield is reached within a period of about from 72 to 120 hours following inoculation of the fermentation medium.

Upon reaching the desired enzyme yield, the mycelium is removed by filtration and the filtered beer processed to recover the galactose oxidase as will be hereinafter described.

The carbohydrate source of the fermentation medium may be any monosaccharide or polysaccharide which is capable of being utilized as a nutrient source for the growth of fungi. In general, both carbohydrates and reduced carbohydrates may be utilized for this purpose. For example, galactose is a very satisfactory carbohydrate source for the fermentation medium. Other carbohydrates which may be used are lactose, sucrose, raffinose, glucose, fructose, mannose, sorbose, beet pulp, orange pulp, and various flours and starches. Among the reduced carbohydrates which have been found effective for this purpose are mannitol, sorbitol, inositol and glycerol. The carbohydrate may be utilized in the fermenation medium in a concentration of up to about 2.0% (w./v.).

The primary organic nitrogen source, which forms another essential element of the fermentation medium in the process of this invention is a material which in general may be characterized as a protein product, for example a protein or a hydrolyzed protein. A wide variety of nitrogen containing materials may be utilized for this purpose. Exemplary of these are casein, casein hydrolyzate, whole milk powder, meat extracts of various types, fish solubles, autoclaved yeast, soybean protein hydrolyzate, cotton-seed meal and various stick liquors. Other proteins or protein hydrolyzates may also be utilized if desired. These products may serve as carbon and vitamin sources as well as being the primary nitrogen source. The primary source of organic nitrogen is used in the fermentation medium in a concentration of about from 0.01% to 0.15% nitrogen (w./v.).

It has been found that greatly increased yields of galactose oxidase and substantially reduced fermentation cycles are possible if an auxiliary organic nitrogen source is used in addition to the primary organic nitrogen source. This auxiliary nitrogen may also serve as a source of carbon for the organism. It may be described as a nitrogen containing carboxylic acid or a derivative thereof. Of particular utility for this purpose are organic nitrogen compounds containing from 1 to 5 carbon atoms. For example, amino acids, such as glycine, aspartic acid, asparagine, glutamic acid or alanine, or ammonium salts of carboxylic acids such as ammonium acetate or various other organic nitrogen compounds such as formamide or urea may be used. The auxiliary nitrogen source may be used in the fermentation medium in a concentration of about from 0.005% to 0.1% nitrogen (w./v.).

The addition of a lipid material to the fermentation medium has been found to greatly enhance the growth of the galactose oxidase producing organism and to produce substantially greater yields of galactose oxidase in shorter fermentation cycles. Any convenient lipid material may be utilized for this purpose such as fats, oils and waxes. Exemplary of such materials are mutton tallow, lard oil, raw linseed oil, peanut oil, olive oil, soybean oil, Wesson oil (a vegetable oil), Mazola oil (a corn oil) and cottonseed oil. In addition, other materials which may be used and which it is intended to include within the terminology "lipid materials" are long chain fatty alcohols such as octadecanol, long chain fatty acids such as stearic acid, and industrial fat-like materials such as sorbitan trioleate. The lipid material may be used in the fermentation medium in a concentration of about from 0.5% to 2.0% (w./v.).

In addition to the above described essential ingredients of the fermentation medium which form the distinguishing features of this invention, the use of other commonly used ingredients is also desirable. For example, mineral salts, such as magnesium sulfate, inorganic nitrogen compounds, such as ammonium nitrate and vitamin mixtures may be deemed desirable.

After the fermentation has proceeded to the desired extent and the yield of galactose oxidase as above mentioned has attained a maximum or at least a commercially desirable level, the fermentation is stopped and the fermentation beer harvested. For recovery of the enzyme, a preferred method is precipitation by means of various organic solvents. For example, acetone, ethanol or isopropanol precipitation may be used for this purpose.

Before harvesting the enzyme, the fermentation beer is filtered, cooled to 15–10° C. with ice bags, fortified with 5–10 grams of potassium dihydrogen phosphate per liter and adjusted to pH 6.3 to 6.8. The addition of the phosphate helps to lower the pH of the beer from about 8 to the desired range. It also helps to increase the salt content of the beer thus facilitating the precipitation of the galactose oxidase. The beer is then added slowly with stirring to two volumes of cold acetone. (Cooled to about −20° C. with solid carbon dioxide.)

In some instances it has been found useful to also add a salt such as ammonium sulfate. Where ammonium sulfate is used it may be added (as a saturated solution) in a quantity of about 5–10 milliliters per liter of original beer. The acetone beer mixture is then allowed to sit for a period of about two hours during which time the enzyme settles out. Thereupon the supernatant is decanted and the precipitated enzyme collected, washed several times with dry acetone and dried. If desired the enzyme may be purified by redissolving in a salt solution such as a 5% solution of sodium chloride. The insoluble inactive material is filtered out and the filtrate dialyzed against distilled water or a dilute salt solution. The enzyme is again precipitated as described above. Further purification may be accomplished by means of column chromatography using a suitable chromatographic medium, for example N,N′-diethylaminoethyl cellulose (DEAE Cellulose). If desired, the enzyme in the dialyzate or eluate may be brought to a solid form by lyophilization.

The galactose oxidase thus recovered is an extremely pure galactose oxidase having high activity for the oxidation of a galactose substrate, and literally no activity with respect to glucose and other carbohydrates. Yields of galactose oxidase may be obtained in amounts of about from 1,000 to 30,000 units per gram. This corresponds to an activity in the beer of about from 5 to 50 units per milliliter. The unit of galactose oxidase activity is defined as that quantity of galactose oxidase that will give the activity equivalent to one unit of glucose oxidase as defined in D. Scott (Jour. Agr. and Food Chem. 1, 727, 1953).

The process above described has been found to produce commercially useful yields of galactose oxidase with fermentation times which are conveniently short and recovery methods which are adaptable to large scale production. Another advantage of this process is the fact that substrate costs are minimal.

The invention will be better understood by reference to the following examples which are included for purposes of illustration and are not to be construed as unduly limiting the scope of this invention which is defined in the claims appended hereto.

EXAMPLE I

A transfer from an agar slant stock culture of *Polyporus circinatus* Fr. into 25 ml. of medium in a 125 ml. Erlenmeyer flask was incubated as a still culture at room temperature for 2 days. The composition of Medium 1 is shown in Table 1 below:

Table 1

(MEDIUM 1)

| Ingredients: | Concentration, grams per liter |
|---|---|
| Galactose | 5.0 |
| Potassium dihydrogen phosphate | 7.5 |
| Ammonium nitrate | 1.0 |
| Magnesium sulfate hydrate | 0.5 |
| Trace element solution [1] | ml 1 |

[1] The trace element solution contains:

| | Mg./100 ml. |
|---|---|
| Ferric nitrate, hydrated | 180 |
| Sodium molybdate hydrate | 85 |
| Cuprous chloride | 15 |
| Manganous sulfate hydrate | 65 |
| Ferric sulfate hydrate | 85 |

The pH of the final medium is adjusted to 6.3 and sterilized.

One liter of Medium 2 in a 2.8 liter Fernbach flask was inoculated with 25 ml. of the still culture and incubated on a rotary shaker at room temperature until the fermentation beer assayed 5–20 units of galactose oxidase per ml. The time required was about 72 hours. The composition of Medium 2 is shown in Table 2 below:

Table 2

(MEDIUM 2)

| Ingredient: | Concentration, grams per liter |
|---|---|
| Galactose | 5 |
| Casein hydrolyzate | 10 |
| Glycine | 5 |
| Lard oil (Larex EWS) | 10 |
| Octadecanol | 1 |
| Potassium dihydrogen phosphate | 0.15 |
| Ammonium nitrate | 1.0 |
| Magnesium sulfate heptahydrate | 0.12 |
| Vitamin mixture | (1 tablet) |

For the vitamin mixture any readily soluble multiple vitamin composition may be used. Such composition usually contains:

| | |
|---|---|
| Vitamin A | 5000 U.S.P. units. |
| Vitamin D | 500 U.S.P. units. |
| Vitamin C | 50 mg. |
| Vitamin $B_1$ | 2 mg. |
| Vitamin $B_2$ | 2.5 mg. |
| Vitamin $B_6$ | 1 mg. |
| Niacinamide | 20 mg. |
| Vitamin $B_{12}$ | 1 mcg. |

This medium was pH adjusted to pH 6.8 with ammonium hydroxide and sterilized.

The galactose oxidase was harvested as described above. The product was found to have an activity of 1,000–2,000 units of galactose oxidase per gram.

EXAMPLE II

The fermentation was accomplished as in Example I. The yields obtained are shown in Table 3 below:

Table 3

| Carbohydrate | Concentration, grams per liter | Yield, units per milliliter |
|---|---|---|
| Galactose | 5 | 30–50 |
| Lactose | 5 | 3–4 |
| Glucose | 5 | 20–40 |
| Mannitol | 5 | 10–30 |
| Sorbitol | 5 | 10–30 |
| Inositol | 5 | 10–30 |
| Beet pulp | 20 | 30–50 |
| Glycerol | 5 | 10–12 |
| Sucrose | 5 | 20–40 |

The protein or hydrolyzed protein may also be widely varied in carrying out the process of this invention. The following example illustrates the use of various proteins and protein derivatives which have been found effective in carrying out the fermentation.

EXAMPLE III

The procedure of Example I was followed except that various proteins and protein derivatives were used in place of casein hydrolyzate. These ingredients are shown in Table 4 below:

*Table 4*

| Protein | Concentration, grams per liter | Yield, units per milliliter |
|---|---|---|
| Dry milk powder | 10 | 10–30 |
| Casein | 10 | 20–50 |
| Meat extract (Bactopeptone) | 10 | 20–50 |
| Trypticase | 10 | 20–50 |
| Meat extract solids | 20 | 20–50 |
| Soybean protein hydrolyzate | 10 | 10–15 |
| Autoclaved yeast | 10 | 20–40 |
| Fish solubles | 20 | 5–10 |

Similarly, other auxiliary nitrogen sources than glycine have been utilized in carrying out the production of galactose oxidase according to the fermentation process of this invention. The following example illustrates the use of various auxiliary nitrogen sources.

EXAMPLE IV

The fermentation was carried out as in Example I above except that various auxiliary nitrogen sources were used. These and the resulting yields obtained are shown in Table 5 below:

*Table 5*

| Auxiliary Nitrogen Source | Concentration, grams per liter | Yield, units per milliliter |
|---|---|---|
| Ammonium acetate | 5 | 15–30 |
| Vormamide | 5 | 5–10 |
| Glutamic acid | 5 | 5–10 |
| Aspartic acid | 5 | 8–10 |
| Asparagine | 5 | 10–20 |
| Alanine | 5 | 15–30 |
| Glycine | 5 | 30–50 |

Various lipid materials have been found to be satisfactory for use in the processes of this invention. The following example illustrates the use of other lipid materials.

EXAMPLE V

Following the procedure of Example I above, fermentations were carried out using other lipid materials in place of lard oil and octadecanol. The various lipid materials and the resulting yields are shown in Table 6 below:

*Table 6*

| Lipid Material | Concentration, grams per liter | Yield, units per milliliter |
|---|---|---|
| Octadecanol | 10 | 5–10 |
| Octadecanol + Lard oil (Larex EWS) | 0.2 / 10 | 30–50 |
| Stearic Acid | 10 | 15–30 |
| Mutton tallow | 10 | 30–50 |
| Cotton-seed oil | 10 | 20–40 |
| Olive oil | 10 | 20–40 |
| Linseed oil | 10 | 20–40 |

In summary, there is provided by this invention a novel fermentation process for the production of galactose oxidase which utilizes a fermentation medium containing a carbohydrate source, a source of organic nitrogen such as protein or protein hydrolyzate, an auxiliary nitrogen source such as a nitrogen containing organic acid derivative, and a lipid material such as lard oil or octadecanol or a mixture thereof.

What is claimed is:

1. A process for the production of galactose oxidase which comprises growing a culture of *Polyporus circinatus* Fr. in an aqueous fermentation medium containing up to about 2.0% (w./v.) of a carbohydrate source selected from the group consisting of galactose, lactose, sucrose, raffincose, glucose, fructose, mannose, sorbose, beet pulp, orange pulp, flour, starch, mannitol, sorbitol, inositol, and glycerol, from about 0.01% to about 0.15% (w./v.) nitrogen in the form of a primary organic nitrogen source selected from the group consisting of casein, casein hydrolyzate, whole milk powder, meat extracts, fish solubles, autoclaved yeast, soybean protein hydrolyzate, cotton-seed meal and stick liquors, from about 0.005% to about 0.1% (w./v.) nitrogen in the form of an auxiliary nitrogen source selected from the group consisting of glycine, aspartic acid, asparagine, glutamic acid, alanine, ammonium acetate, formamide and urea, and from about 0.5% to about 2.0% (w./v.) of a lipid material selected from the group consisting of mutton tallow, lard oil, linseed oil, peanut oil, olive oil, soybean oil, vegetable oil, corn oil, cotton-seed oil, octadecanol, stearic acid and sorbitan trioleate.

2. A process according to claim 1 which is carried out at a temperature of from about 23° C. to about 30° C. at an initial hydrogen ion concentration of from about pH 6.3 to about pH 6.8 for a period of from about 72 hours to about 120 hours.

3. A process according to claim 1 wherein the carbohydrate source is sucrose.

4. A process according to claim 1 wherein the carbohydrate source is galactose.

5. A process according to claim 1 wherein the primary organic nitrogen source is casein hydrolyzate.

6. A process according to claim 1 wherein the auxiliary nitrogen source is glycine.

7. A process according to claim 1 wherein said lipid material is lard oil.

8. A process according to claim 1 wherein said lipid material is octadecanol.

9. A process according to claim 1 wherein said lipid material is a mixture of lard oil and octadecanol.

References Cited by the Examiner

UNITED STATES PATENTS

| | | | |
|---|---|---|---|
| 2,701,227 | 2/55 | Ablondi et al. | 195—66 |
| 2,888,385 | 5/59 | Grandel | 195—67 |
| 2,890,989 | 6/59 | Anderson | 195—78 |
| 3,005,714 | 10/61 | Cooper | 195—66 X |
| 3,013,947 | 12/61 | Bessell et al. | 195—101 X |
| 3,063,914 | 11/62 | Von Polnitz et al. | 195—66 |
| 3,097,145 | 7/63 | Shimazono et al. | 195—62 |

A. LOUIS MONACELL, *Primary Examiner.*

ABRAHAM H. WINKELSTEIN, WILLIAM B. KNIGHT, *Examiners.*